United States Patent [19]

Yoshida

[11] Patent Number: 5,200,916
[45] Date of Patent: Apr. 6, 1993

[54] MANTISSA PROCESSING CIRCUIT OF FLOATING POINT ARITHMETIC APPARATUS FOR ADDITION AND SUBTRACTION

[75] Inventor: Tadahiro Yoshida, Osaka, Japan

[73] Assignee: Matsushita Electric Industrial Co., Ltd., Osaka, Japan

[21] Appl. No.: 813,664

[22] Filed: Dec. 27, 1991

[30] Foreign Application Priority Data

Dec. 28, 1990 [JP] Japan .................................. 2-408822

[51] Int. Cl.$^5$ .............................................. G06F 7/38
[52] U.S. Cl. ..................................................... 364/748
[58] Field of Search ........................................ 364/748

[56] References Cited

U.S. PATENT DOCUMENTS

| | | | |
|---|---|---|---|
| 4,644,490 | 2/1987 | Kobayashi et al. | 364/748 |
| 4,926,369 | 5/1990 | Hokenek et al. | 364/748 |
| 5,063,530 | 11/1991 | Ishikawa | 364/748 |
| 5,075,882 | 12/1991 | Sakai et al. | 364/748 |

FOREIGN PATENT DOCUMENTS 2-75017 3/1990 Japan .
2-144624 6/1990 Japan .

OTHER PUBLICATIONS

Kaneko et al., "A VLSI RISC with 20-MFLOPS Peak, 64-bit Floating-Point Unit", IEEE Journal of Solid-State Circuits, vol. 24, No. 5, Oct. 1989, pp. 1331-1340.

Primary Examiner—Tan V. Mai
Attorney, Agent, or Firm—Willian Brinks Olds Hofer Gilson & Lione

[57] ABSTRACT

A mantissa processing circuit of a floating point arithmetic apparatus defines an arithmetic unit 11, a rounding adder 12, a postshift-count-encode circuit (PSCE circuit) 13, and a postshift circuit 14. The arithmetic unit 11 outputs as a first intermediate result (intermediate sum) R1 the results of addition and subtraction on preshifted mantissa data ma and mb. The rounding adder 12 outputs as a second intermediate result (rounding result) R2 the result of rounding addition for the intermediate sum R1. The PSCE circuit 13 outputs data on postshift to be applied to the rounding result R2. The postshift circuit 14 actually shifts the rounding result R2 to the right or left for normalization. The PSCE circuit 13 includes a shifting part 15 and a shift correcting part 16. The shifting part 15 specifies the contents of postshift according to the position of the first non-zero value bit in the intermediate sum R1. The shift correcting part 16 corrects the quantity of postshift when it is expected that the position of the first non-zero value bit is moved for a carry at the time of rounding addition. The rounding adder 12 and the PSCE circuit 13 execute processing in parallel, so that there can be enhanced the processing speeds of the rounding and normalization for the results of addition and subtraction on the mantissa data ma and mb.

4 Claims, 5 Drawing Sheets

MANTISSA PROCESSING CIRCUIT OF FLOATING POINT ARITHMETIC APPARATUS FOR ADDITION AND SUBTRACTION

BACKGROUND OF THE INVENTION

The present invention relates to a mantissa processing circuit for executing the addition and subtraction of mantissa parts of two operands and for performing rounding and normalization for the result of addition and subtraction of the mantissa parts in a floating point arithmetic apparatus for addition and subtraction which receives two floating point numbers as the operands, each floating point number having a sign bit, an exponent part and the mantissa part and being normalized.

In the field of scientific and technical calculation, a floating point number has mainly been used as the expression form of a real number in a computer because precision in calculation is high, a wide numerical range can be expressed, and the like.

By way of example, the format of a 64-bit normalized double-precision floating point number provided by IEEE754 is shown in FIG. 5. In FIG. 5, S denotes a sign bit of 1 bit, e denotes an exponent part of 11 bits, and m is a mantissa part of 52 bits from the most significant bit M to the least significant bit L. A real number expressed by the floating point number of the above-mentioned format is as follows.

$$(-1)^S 2^{e-1023}(1.m)$$

More specifically, there is adopted the normalized expression form in which the value of the exponent part e is adjusted such that a virtual non-zero value bit and a fracture point are positioned in the higher order than the most significant bit M of the mantissa part m.

FIG. 6 is a format diagram showing a method for treating the mantissa (fraction) part m for addition and subtraction in the floating point arithmetic apparatus. The sign bit S shown in FIG. 5, and an extended bit u and a leading bit v forming an integer part of 2 bits are sequentially added to the higher order than the most significant bit M of the mantissa part m of n bits (hereinafter, the number of bits of the mantissa part m is represented by n). A value of 01 is set to the integer part uv formed by the extended bit u and the leading bit v (u=0, v=1). A guard bit g and a round bit r are sequentially added to the lower order than the least significant bit L of the mantissa part m. A value of 00 is set to the guard bit g and the round bit r (g=r=0). There are some cases where a sticky bit s for expressing the presence of a bit-discard is added to the lower order than the round bit r. In this case, however, there is no sticky bit s. More specifically, the mantissa part m is treated as mantissa data having the following data structure of (n+5) bits in the floating point arithmetic apparatus.

```
S u v   M           L g r
x 0 1.  x... ...    x 0 0
(x : 0 or 1)
```

In the case where two operands are the above-mentioned normalized floating point numbers, addition and subtraction are executed in accordance with the following steps (1) to (7), for example.

(1) The values of the exponent parts of the operands are compared with each other.

(2) In the case where the values of the exponent parts do not correspond to each other, the mantissa data of one of the operands which has the smaller exponent part than that of the other is shifted by a bit number equal to the difference between the values of the exponent parts in the low order direction, i.e., to the right. Consequently, the mantissa data of the operands are aligned in bits. This operation is called "preshift". When executing preshift, the non-zero value of the leading bit v enters the fraction part, and the value of the least significant bit L of the fraction part sequentially goes out to the guard bit g and the round bit r.

(3) Binary addition and subtraction are executed on two mantissa data so as to obtain a first intermediate result (intermediate sum). In this case, there is executed the binary addition and subtraction on (n+5) bits including the sign bit S, extended bit u, leading bit v, guard bit g and round bit r. In case of subtraction, all the values of (n+5) bits of the mantissa data as a subtrahend are inverted. The values thus inverted are binary-added to the mantissa data as a minuend. Then, 1 is added to the round bit r of the result of the binary addition. In other words, 2's complement of the subtrahend is added to the minuend.

(4) To set significant bits to n bits, 1 is added to a bit of the first intermediate result so as to obtain a second intermediate result (rounding result). A bit as a target of rounding addition is chosen among the least significant bit L, the guard bit g and the round bit r is consideration of normalization.

By way of example, when a first intermediate result R1 is as follows, 1 is added to the least significant bit L of the fraction part so as to set to the significant bits n bits of the leading bit v and succeeding bits which are subsequent to the extended bit u of the non-zero value.

```
      S u v   M           L g r
R1 =  0 1 0.  x... ...    x x 0
```

When the first intermediate result R1 is negative as follows, the values of (n+4) bits other than the sign bit S of the first intermediate result R1 are inverted in order to execute rounding and positive-numbering of the mantissa part. Then, 1 is added to the round bit r so that the second intermediate result is obtained.

```
      S u v   M           L g r
R1 =  1 1 1.  x... ...    x 0 0
```

When the first intermediate result R1 is as follows, the round bit r is included in the significant bits of n bits. Consequently, rounding addition is not executed.

```
      S u v   M           L g r
R1 =  0 0 0.  0... ...    x x x
```

(5) The direction and quantity of postshift to be applied to the second intermediate result for normalization are determined, which is called postshift-count-encoding. By way of example, when a second intermediate result R2 is as follows, it is necessary to shift the second intermediate result R2 by 1 bit to the right for normalization.

```
          S u v   M         L g r
R2   =    0 1 0.  x ... ... x 0 0
```

When the second intermediate result R2 is as follows, it is necessary to shift the second intermediate result R2 by 2 bits to the left for normalization.

```
          S u v   M       . L g r
R2   =    0 0 0.  0 1 ... ... x x x
```

Consequently, in the case where the value of the integer part uv is 00, the number k of zero value bits is examined from the leading bit v to the first non-zero value bit of the second intermediate result R2 sequentially in the low order direction. The number k of the zero value bits is a left postshift quantity. When the value of the extended bit u of the integer bit uv is 1, $k=-1$ (postshift is executed by 1 bit to the right). When the value of the integer part uv is 01, $k=0$ (postshift is not executed).

(6) The second intermediate result R2 is actually shifted to the right or left in accordance with the shift quantity k obtained in (5) (a postshift quantity based on the second intermediate result R2). As the mantissa part of a calculation result fetched n bits from the most significant bit M to the least significant bit L of the fraction part of the mantissa data after postshift. The sign bit S of the mantissa data after postshift is fetched. The sign bit S thus fetched is the sign bit of the calculation result.

(7) Correspondingly to the postshift of the second intermediate result R2 by the shift quantity k, the postshift quantity $k (=-1, 0, +1, +2, ...)$ is subtracted from the value of the greater exponent part of two operands. A value thus obtained is the exponent part of the calculation result.

According to the steps (1) to (7), there can be obtained the calculation result comprising a normalized format shown in FIG. 5 which has a mantissa part as the result of rounding addition.

FIG. 4 is a block diagram showing an example of a mantissa processing circuit for executing the steps (3) to (6) in a conventional floating point arithmetic apparatus for executing the addition and subtraction of normalized floating point numbers in accordance with the steps (1) to (7). In FIG. 4, the reference numeral 41 denotes an arithmetic unit, the reference numeral 42 denotes a rounding adder, the reference numeral 43 denotes a postshift-count-encode circuit (PSCE circuit), and the reference numeral 44 denotes a postshift circuit. The arithmetic unit 41 serves to execute the binary addition and subtraction of mantissa data ma and mb to which preshift has been already applied, and to output a result as a first intermediate result (intermediate sum) R1. The rounding adder 42 serves to execute addition for rounding and positive-numbering the first intermediate result R1 from the arithmetic unit 41, and to output a result as a second intermediate result (rounding result) R2. The PSCE circuit 43 serves to determine a postshift quantity $k (=-1, 0, +1, +2, ...)$ to be applied to the second intermediate result R2 from the rounding adder 42 for normalization based on the second intermediate result R2. The postshift circuit 44 serves to actually shift the second intermediate result R2 from the rounding adder 42 to the right or left in accordance with the shift quantity k from the PSCE circuit 43, and to output the result of postshift as the mantissa data mc of a calculation result.

The mantissa processing circuit of the conventional floating point arithmetic apparatus for addition and subtraction has a structure in which the processing for the first intermediate result (intermediate sum) R1 executed by the rounding adder 42 is terminated, and postshift-count-encoding is then executed by the PSCE circuit 43 based on the second intermediate result (rounding result) R2 outputted from the rounding adder 42. Consequently, the above-mentioned structure is the bottleneck of high speed calculation.

It is an object of the present invention to improve a mantissa processing circuit for executing the addition and subtraction of mantissa parts of two operands and for performing rounding and normalization for the result of addition and subtraction so that the high speed execution of addition and subtraction can be realized in a floating point arithmetic apparatus.

SUMMARY OF THE INVENTION

To achieve the above-mentioned object, the present invention adopts a structure in which postshift-count-encoding is executed in parallel with rounding addition based on a first intermediate result (intermediate sum) R1.

More specifically, the present invention provides a mantissa processing circuit for executing the addition and subtraction of mantissa parts of two operands and for performing rounding and normalization for the results of addition and subtraction of the mantissa parts in a floating point arithmetic apparatus for addition and subtraction which receives two floating point numbers as the operands, each floating point number having a sign bit, an exponent part and the mantissa part of n bits and being normalized, comprising an arithmetic unit, a rounding adder, a postshift-count-encode circuit (PSCE circuit) and a postshift circuit to be described below. The arithmetic unit receives the mantissa parts of the operands as input data ma and mb wherein the mantissa part of one of the operands which has the smaller exponent part than that of the other is preshifted in the low order direction by a bit number equal to the difference between the values of the exponent parts of the operands when the values of the exponent parts do not correspond to each other, receives the mantissa parts of the operands as input data ma and mb which are not preshifted when the values of the exponent parts of the operands correspond to each other, executes binary addition and subtraction on two input data ma and mb thus received, and outputs the results of binary addition and subtraction as a first intermediate result R1. The rounding adder executes rounding addition on the first intermediate result R1 from the arithmetic unit and outputs the result of rounding addition as a second intermediate result R2. The PSCE circuit generates data on the direction and quantity of postshift to be applied to the second intermediate result R2 from the rounding adder for normalization based on the first intermediate result R1 from the arithmetic unit, and outputs the data thus generated as postshift data k1 and k2. The postshift circuit shifts the second intermediate result R2 from the rounding adder in the high or low order direction in accordance with the postshift data k1 and k2 from the PSCE circuit, and outputs the result of shift as output data mc including the mantissa part of a calculation result.

According to the present invention, the first intermediate result (intermediate sum) R1 outputted from the arithmetic unit is inputted to the rounding adder and the PSCE circuit. More specifically, the PSCE circuit executes postshift-count-encoding in parallel with rounding addition based on the first intermediate result R1 from the arithmetic unit without starting the postshift-count-encoding after the second intermediate result R2 is outputted from the rounding adder. Consequently, the processing speeds of rounding and normalization for the first intermediate result R1 can be enhanced. In addition, it is possible to realize the high-speed execution of addition and subtraction in the floating point arithmetic apparatus.

It is preferred that the PSCE circuit includes a shifting part and a shift correcting part to be described below. The shifting part sequentially searches for a first non-zero value bit in the low order direction from the highest order bit of the first intermediate result R1 from the arithmetic unit, generates data on the direction and quantity of postshift according to the position of the first non-zero value bit thus obtained, and gives to the postshift circuit the generated data as a first postshift data k1. The shift correcting part gives to the postshift circuit a second postshift data k2 that additional postshift should be executed by 1 bit in the low order direction when it is expected that the position of the first non-zero value bit of the first intermediate result R1 from the arithmetic unit is moved by 1 bit in the high order direction for rounding addition executed by the rounding adder.

According to the above-mentioned structure, the contents of the postshift are specified by the shifting part of the PSCE circuit based on the position of the first non-zero value bit of the first intermediate result R1 from the arithmetic unit. The contents are corrected by the shift correcting part of the PSCE circuit according to whether the position of the first non-zero value bit of the first intermediate result R1 is moved at the time of rounding addition. Consequently, proper postshift can surely be executed.

More preferably, the arithmetic unit receives the following two mantissa data ma and mb as the input data. More specifically, each of the mantissa data ma and mb has a data structure of (n+5) bits including the respective mantissa part m of the operand as a fraction part of n bits in which the sign bit S of the operand and an extended bit u and a leading bit v forming an integer part of 2 bits are sequentially added to the higher order than the most significant bit M of the respective mantissa part m of the operand in the low order direction, and a guard bit g and a round bit r are sequentially added to the lower order than the least significant bit L of the respective mantissa part m of the operand in the low order direction, and in which a value of 01 is set to the integer part uv formed by the extended bit u and leading bit v of the respective mantissa data ma and mb, a value of 0 is set to the guard bit g and round bit r of the respective mantissa data ma and mb, and preshift is applied as necessary such that the non-zero value of the leading bit v of either of the mantissa data ma and mb enters the fraction part m of the mantissa data and the value of the least significant bit L of the fraction part m sequentially goes out to the guard bit g and round bit r of the mantissa data.

In the case where it is assumed that the arithmetic unit receives the mantissa data ma and mb as the input data, the functions of the arithmetic unit, the rounding adder, and the shifting part and shift correcting part of the PSCE circuit are determined as follows.

The arithmetic unit has the function of executing binary addition and subtraction on (n+5) bits of the mantissa data ma and mb thus received, and outputting as the first intermediate result R1 having a data structure of (n+5) bits which is the same as in the mantissa data ma and mb a result obtained by inverting the values of bits other than the sign bit S of the result of addition and subtraction when the value of the sign bit S of the result of addition and subtraction is 1, and the result of addition and subtraction when the value of the sign bit S of the result of addition and subtraction is 0.

The rounding adder has the function of outputting as the second intermediate result R2 to the postshift circuit a result obtained by adding 1 to the least significant bit L of the fraction part m of the first intermediate result R1 from the arithmetic unit when the value of the sign bit S of the first intermediate result R1 is 0 and the value of the integer part uv of the first intermediate result R1 is 10 or 11, a result obtained by adding 1 to the guard bit g of the first intermediate result R1 from the arithmetic unit when the value of the sign bit S of the first intermediate result R1 is 0 and the value of the integer part uv of the first intermediate result R1 is 01, a result obtained by adding 1 to the round bit r of the first intermediate result R1 from the arithmetic unit when the value of the sign bit S of the first intermediate result R1 is 0, the value of the integer part uv of the first intermediate result R1 is 00, and the value of the most significant bit M of the fraction part m of the first intermediate result R1 is 1, or when the value of the sign bit S of the first intermediate result R1 is 1, and the first intermediate result R1 from the arithmetic unit in other cases.

The shifting part of the PSCE circuit has the function of outputting as the first postshift data k1 to the postshift circuit data that postshift should be executed by 1 bit in the low order direction when the value of the integer part uv of the first intermediate result R1 from the arithmetic unit is 10 or 11, data that a quantity of postshift should be 0 when the value of the integer part uv of the first intermediate result R1 from the arithmetic unit is 01, and data that the number of zero value bits including the leading bit v from the leading bit v to the first non-zero value bit of the first intermediate result R1 from the arithmetic unit in the low order direction should be a shift quantity in the high order direction when the value of the integer part uv of the first intermediate result R1 is 00.

The shift correcting part of the PSCE circuit has a first detecting circuit for outputting a first detecting signal when (n+2) bits from the leading bit v to the guard bit g of the first intermediate result R1 from the arithmetic unit are non-zero value bits, a second detecting circuit for outputting a second detecting signal when bits other than continuous zero value bits including the extended bit u among (n+4) bits from the extended bit u to the round bit r of the first intermediate result R1 from the arithmetic unit are non-zero value bits, and the function of outputting the second postshift data k2 to the postshift circuit when either of the first and second detecting signals is outputted.

According to the above-mentioned structure, the mantissa (fraction) parts m of n bits of two operands are treated as mantissa data ma and mb, each mantissa data having a data structure of (n+5) bits in which the sign bit S, extended bit u, leading bit v, guard bit g and round bit r are added in the mantissa processing circuit. When the result of binary addition and subtraction is negative, the arithmetic unit outputs as the first intermediate result R1 the result of addition and subtraction inverted for positive-numbering. The rounding adder outputs as the second intermediate result R2 to the postshift circuit a result obtained by adding 1 to any of the least significant bit L, of the fraction part m guard bit g and round bit r of the first intermediate result R1 from the arithmetic unit. In this case, when the rounding adder receives the first intermediate result R1 inverted, 1 is added to the round bit r of the first intermediate result R1 so that rounding and positive-numbering are completed. The shifting part of the PSCE circuit sequentially examines the extended bit u, leading bit v, fraction part m, guard bit g and round bit r of the first intermediate result R1 from the arithmetic unit in the low order direction and gives to the postshift circuit a first postshift data k1 that the direction and quantity of postshift is specified according to the position of the first non-zero value bit.

Since normalized floating point numbers are received as operands, the position of the first non-zero value bit of the first intermediate result R1 from the arithmetic unit is moved by 1 bit in the high order direction for a carry at the time of rounding addition in the cases where 1 is added to the guard bit g and 1 is added to the round bit r, which will be described below.

From the aspect of a data structure of (n+5) bits of the first intermediate result R1, the first case corresponds to the case where (n+2) bits from the leading bit v to the guard bit g of the first intermediate result R1 are non-zero value bits (hereinafter, this state is represented by R1=all 1). By way of example, when the first intermediate result R1 is as follows, 1 is added to the guard bit g so that a carry sequentially occurs.

```
        S u v   M           L g r
R1  =   0 0 1.  1 . . .  . . . 1 1 0
```

Consequently, the following second intermediate result R2 is outputted from the rounding adder.

```
        S u v   M           L g r
R2  =   0 1 0.  0 . . .  . . . 0 0 0
```

The second case corresponds to the case where bits other than continuous zero value bits including the extended bit u among (n+4) bits from the extended bit u to the round bit r of the first intermediate result R1 are non-zero value bits (hereinafter, this state is called "data is divided" and represented by R1=div 01. By way of example, when the first intermediate result R1 is as follows, 1 is added to the round bit r so that a carry sequentially occurs.

```
        S u v   M           L g r
R1  =   1 0 0.  0 . . .  0 0 1 1 . . . 1 1 1
```

Consequently, the following second intermediate result R2 is outputted from the rounding adder.

```
        S u v   M           L g r
R2  =   1 0 0.  0 . . .  0 1 0 0 . . . 0 0 0
```

Only in the cases where R1=all 1 and R1=div 01, the position of the first non-zero value bit of the first intermediate result R1 is moved at the time of rounding addition as described above. Correspondingly, the shift correcting part of the PSCE circuit has a first detecting circuit and a second detecting circuit. The first detecting circuit outputs a first detecting signal when it is detected that R1=all 1. The second detecting circuit outputs a second detecting signal when it is detected that R1=div 01. When either of the first and second detecting signals is outputted, the shift correcting part gives to the postshift circuit a second postshift data k2 that additional postshift should be executed by 1 bit in the low order direction so as to correct postshift in accordance with only the first postshift data k1 from the shifting part based on the first intermediate result R1. Consequently, in the case where the sign bit S, extended bit u, leading bit v, guard bit g and round bit r are added to the mantissa part m of n bits of the operand, proper postshift can surely be executed.

More preferably, the arithmetic unit receives the following two mantissa data ma and mb as the input data. More specifically, each of the mantissa data ma and mb has a data structure of (n+6) bits including the respective mantissa part m of the operand as a fraction part of n bits in which the sign bit S of the operand and an extended bit u and a leading bit v forming an integer part of 2 bits are sequentially added to the higher order than the most significant bit M of the respective mantissa part m of the operand in the low order direction, and a guard bit g, a round bit r and a sticky bit s are sequentially added to the lower order than the least significant bit L of the respective mantissa part m of the operand in the low order direction, and in which a value of 01 is set to the integer part uv formed by the extended bit u and leading bit v of the respective mantissa data ma and mb, a value of 0 is set to the guard bit g, round bit r and sticky bit s of the respective mantissa data ma and mb, and preshift is applied as necessary such that the non-zero value of the leading bit v of either of the mantissa data ma and mb enters the fraction part m of the mantissa data, the value of the least significant bit L of the fraction part m sequentially goes out to the guard bit g and round bit r of the mantissa data and a value of 1 is set to the sticky bit s of the mantissa data when there is a bit-discard from the round bit r.

In the case where it is assumed that the arithmetic unit receives the mantissa data ma and mb as the input data, the functions of the arithmetic unit, the rounding adder, and the shifting part and shift correcting part of the PSCE circuit are determined as follows.

The arithmetic unit has the function of executing binary addition and subtraction on (n+6) bits of the mantissa data ma and mb thus received, and outputting as the first intermediate result R1 having a data structure of (n+6) bits which is the same as in the mantissa data ma and mb a result obtained by inverting the values of bits other than the sign bit S of the result of addition and subtraction when the value of the sign bit S of the result of addition and subtraction is 1, and the result of addition and subtraction when the value of the sign bit S of the result of addition and subtraction is 0.

The rounding adder has the function of outputting as the second intermediate result R2 to the postshift circuit a result obtained by adding 1 to the least significant bit L of the fraction part m of the first intermediate result R1 from the arithmetic unit when the value of the sign bit S of the first intermediate result R1 is 0, the value of the integer part uv of the first intermediate result R1 is 10 or 11, and the logical sum of the values of the guard bit g, round bit r and sticky bit s of the first intermediate result R1 is 1, or when the value of the sign bit S of the first intermediate result R1 is 0, the value of the integer part uv of the first intermediate result R1 is 10 or 11, the logical sum of the values of the guard bit g, round bit r and sticky bit s of the first intermediate result R1 is 0, and the value of a bit in the higher order than the least significant bit L of the fraction part m of the first intermediate result R1 by 1 bit is 1, a result obtained by adding 1 to the guard bit g of the first intermediate result R1 from the arithmetic unit when the value of the sign bit S of the first intermediate result R1 is 0, the value of the integer part uv of the first intermediate result R1 is 01, and the logical sum of the values of the round bit r and sticky bit s of the first intermediate result R1 is 1, or when the value of the sign bit S of the first intermediate result R1 is 0, the value of the integer part uv of the first intermediate result R1 is 01, the logical sum of the values of the round bit r and sticky bit s of the first intermediate result R1 is 0, and the value of the least significant bit L of the fraction part m of the first intermediate result R1 is 1, a result obtained by adding 1 to the round bit r of the first intermediate result R1 from the arithmetic unit when the value of the sign bit S of the first intermediate result R1 is 0, the value of the integer part uv of the first intermediate result R1 is 00, the value of the most significant bit M of the fraction part m of the first intermediate result R1 is 1, and the value of the sticky bit s of the first intermediate result R1 is 1, when the value of the sign bit S of the first intermediate result R1 is 0, the value of the integer part uv of the first intermediate result R1 is 00, the value of the most significant bit M of the fraction part m of the first intermediate result R1 is 1, the value of the sticky bit s of the first intermediate result R1 is 0, and the value of the guard bit g of the first intermediate result R1 is 1, or when the value of the sign bit S of the first intermediate result R1 is 1, and the first intermediate result R1 from the arithmetic unit in other cases.

The shifting part of the PSCE circuit has the function of outputting as the first postshift data k1 to the postshift circuit data that postshift should be executed by 1 bit in the low order direction when the value of the integer part uv of the first intermediate result R1 from the arithmetic unit is 10 or 11, data that a quantity of postshift should be 0 when the value of the integer part uv of the first intermediate result R1 from the arithmetic unit is 01, and data that the number of zero value bits including the leading bit v from the leading bit v to the first non-zero value bit of the first intermediate result R1 from the arithmetic unit in the low order direction should be a shaft quantity in the high order direction when the value of the integer part uv of the first intermediate result R1 is 00.

The shift correcting part of the PSCE circuit has a first detecting circuit for outputting a first detecting signal when (n+2) bits from the leading bit v to the guard bit g of the first intermediate result R1 from the arithmetic unit are non-zero value bits, a second detecting circuit for outputting a second detecting signal when bits other than continuous zero value bits including the extended bit u among (n+4) bits from the extended bit u to the round bit r of the first intermediate result R1 from the arithmetic unit are non-zero value bits, and the function of outputting the second postshift data k2 to the postshift circuit when either of the first and second detecting signals is outputted.

According to the above-mentioned structure, the mantissa (fraction) parts m of n bits of two operands are treated as mantissa data ma and mb, each mantissa data having a data structure of (n+6) bits in which the sticky bit s is further added to the lower order than the round bit r in the mantissa processing circuit. Also in this case, a bit as a target of rounding in the rounding adder is any of the least significant bit L of the fraction part m, guard bit g or round bit r of the first intermediate result R1 from the arithmetic unit. Only in the cases where 1 is added to the guard bit g and 1 is added to the round bit r, the position of the first non-zero value bit of the first intermediate result R1 from the arithmetic unit is moved by 1 bit in the high order direction for a carry at the time of rounding addition. More specifically, only in the cases where R1=all 1 and R1=div 01, the position of the first non-zero value bit in the first intermediate result R1 is moved at the time of rounding addition in similar to the case where there is no sticky bit s. Correspondingly, in the PSCE circuit having the sticky bit s introduced therein are provided the shifting part and the shift correcting part having the same structures as in the case where there is no sticky bit s. Consequently, proper postshift can surely be executed.

The second detecting circuit provided in the shift correcting part of the PSCE circuit can be realized by a first logic circuit, a second logic circuit and a third logic circuit, in the case where (n+4) bit values b (i) (i=n+3 to 0) are defined such that the value of the extended bit u among (n+4) bits from the extended bit u to the round bit r of the first intermediate result R1 from the arithmetic unit is represented by b (n+3) and the value of the round bit r is represented by b (0). The first logic circuit sets an output bit value p (i) to 1 when b (i+1) does not correspond to b (i) (i=n+2 to 0) and to 0 when they correspond to each other. The second logic circuit sets an output bit value q (i) to 1 when b (i+1) is 0 and b (i) is 1 (i=n+2 to 0) and to 0 in other cases. The third logic circuit outputs the second detecting signal only when the output bit value p (i) of the first logic circuit corresponds to the output bit value q (i) of the second logic circuit for all values of i (i=n+2 to 0). According to the above-mentioned circuit structure, hardware is slightly increased but it is possible to detect whether the data of the first intermediate result R1 from the arithmetic unit is divided, i.e., R1=div 01.

This and other objects, features and advantages of the present invention will become more apparent upon a reading of the following detailed description and drawings.

DETAILED DESCRIPTION OF THE PREFERRED EMBODIMENT

An embodiment of the present invention will be described in detail with reference to the drawings and based on numeric examples.

Figure 1:
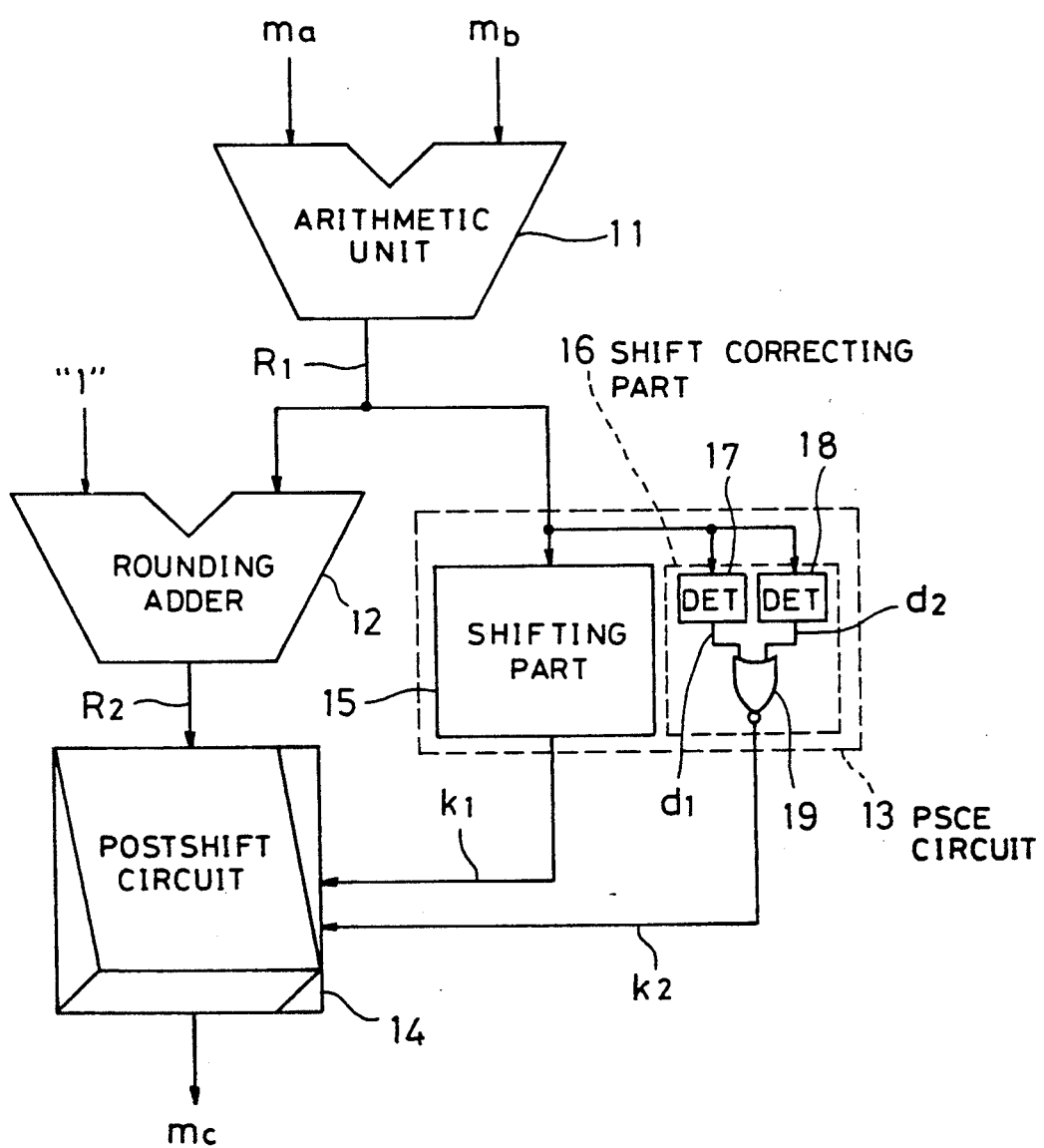
FIG. 1 is a block diagram of a mantissa processing circuit according to an embodiment of the present invention.

FIG. 1 is a block diagram showing a mantissa processing circuit of a floating point arithmetic apparatus for addition and substraction according to an embodiment of the present invention. Two operands Xa and Xb for addition and subtraction and a calculation result Xc have 64-bit normalized double-precision floating point number formats shown in FIG. 5. The exponent parts e of 11 bits of the operands Xa, Xb and calculation result Xc are represented by ea, eb and ec. The mantissa parts m of 52 bits are represented by $\mu a$, $\mu b$ and $\mu c$. When each bit number is represented by n, the mantissa parts $\mu a$, $\mu b$, and $\mu c$ are treated as mantissa data ma, mb and mc of $(n+5)$ bits having a format shown in FIG. 6 in the floating point arithmetic apparatus. In addition, the mantissa data ma and mb given to the mantissa processing circuit of the present embodiment have been aligned in bits. The bit alignment is carried out by preshifting the mantissa data mb of the operand having a smaller exponent part, for example, a second operand Xb by a bit number equal to the difference (ea−eb) between the values of the exponent parts of the operands Xa and Xb in the low order direction. Referring to the present embodiment, there is no sticky bit s.

In FIG. 1, the reference numeral 11 denotes an arithmetic unit, the reference numeral 12 denotes a rounding adder, the reference numeral 13 denotes a postshift-count-encode circuit (PSCE circuit), and the reference numeral 14 denotes a postshift circuit. The arithmetic unit 11 serves to execute the binary addition and subtraction of the mantissa data ma and mb and to output a result as a first intermediate result (intermediate sum) R1. The rounding adder 12 serves to execute rounding addition for the first intermediate result R1 from the arithmetic unit 11 and to output a result as a second intermediate result (rounding result) R2. The PSCE circuit 13 serves to generate data on the direction and quantity of postshift to be applied to the second intermediate result R2 obtained from the rounding adder 12 for normalization based on the first intermediate result R1 from the arithmetic unit 11 and to output the data as postshift data k1 and k2. The postshift circuit 14 serves to shift the second intermediate result R2 from the rounding adder 12 in the high or low order direction in accordance with the postshift data k1 and k2 from the PSCE circuit 13 and to output a calculation result as mantissa data mc.

Figure 6:
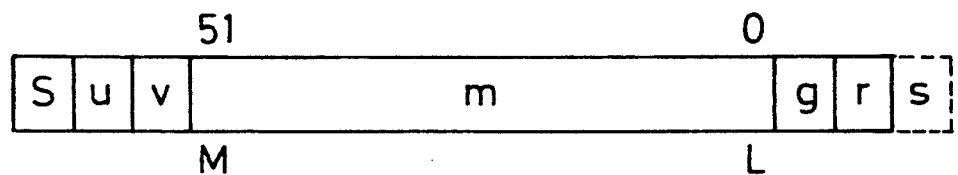
FIG. 6 is a view conceptually showing an example of the format of mantissa data including a mantissa part for the mantissa processing circuit shown in FIG. 5.

The arithmetic unit 11 inputs the preshifted mantissa data ma and mb, executes the binary addition and subtraction on $(n+5)$ bits of the mantissa data ma and mb thus inputted, and outputs as the first intermediate result R1 having a data structure of $(n+5)$ bits shown in FIG. 6 a result obtained by inverting the values of bits other than a sign bit S when the value of the sign bit S obtained by the addition and substraction is 1, and the result of addition and subtraction when the value of the sign bit S is 0.

The rounding adder 12 outputs as the second intermediate result R2 to the postshift circuit 14 a result obtained by adding 1 to the least significant bit L of the fraction part m of the first intermediate result R1 from the arithmetic unit 11 when the value of the sign bit S of the first intermediate result R1 is 0 and the value of an integer part uv of the first intermediate result R1 is 10 or 11, a result obtained by adding 1 to the guard bit g of the first intermediate result R1 from the arithmetic unit 11 when the value of the sign bit S of the first intermediate result R1 is 0 and the value of the integer part uv of the first intermediate result R1 is 01, a result obtained by adding 1 to the round bit r of the first intermediate result R1 from the arithmetic unit 11 when the value of the sign bit S of the first intermediate result R1 is 0, the value of the integer part uv of the first intermediate result R1 is 00 and the value of the most significant bit M of the fraction part m of the first intermediate result R1 is 1, or when the value of the sign bit S of the first intermediate result R1 is 1, and the first intermediate result R1 from the arithmetic unit 11 in other cases.

The PSCE circuit 13 includes a shifting part 15 and a shift correcting part 16 to be described below.

The shifting part 15 of the PSCE circuit 13 serves to sequentially search for a first non-zero value bit from the highest order bit of the first intermediate result R1 from the arithmetic unit 11 in the low order direction, i.e., to the right, to generate data on the direction and quantity of postshift according to the position of the first non-zero value bit thus obtained, and to give the generated data as a first postshift data k1 to the postshift circuit 14. More specifically, the shifting part 15 has the function of outputting as the first postshift data k1 to the postshift circuit 14 data that postshift should be executed by 1 bit to the right when the value of the integer part uv of the first intermediate result R1 from the arithmetic unit 11 is 10 or 11, data that the postshift quantity should be set to 0 when the value of the integer part uv of the first intermediate result R1 from the arithmetic unit 11 is 01, and data that the number of zero-value bits including the leading bit v from the leading bit v to the first non-zero value bit of the first intermediate result R1 from the arithmetic unit 11 to the right should be a left shift quantity when the value of the integer part uv of the first intermediate result R1 is 00. When shifted to the left, a shift quantity having a positive sign is a first postshift data k1. When postshifted by 1 bit to the right, k1 is set to −1. When postshift is not executed, k1 is set to 0. In other words, the first postshift data k1 has any value of −1, 0, +1, +2, . . . .

The shift correcting part 16 of the PSCE circuit 13 serves to give a second postshift data k2 that additional postshift should be executed by 1 bit to the right to the postshift circuit 14 when it is expected that the position of the first non-zero value bit of the first intermediate result R1 from the arithmetic unit 11 is moved by 1 bit to the left for rounding addition executed by the rounding adder 12. For this reason, the shift correcting part 16 includes first and second detecting circuits 17 and 18, and a NOR gate 19. The first detecting circuit 17 serves to output a first detecting signal d1 when $(n+2)$ bits from the leading bit v to the guard bit g of the first intermediate result R1 from the arithmetic circuit 11 are non-zero value bits, i.e., R1=all 1. The second detecting circuit 18 serves to output a second detecting signal d2 when bits other than continuous zero value bits including the extended bit u among $(n+4)$ bits from the extended bit u to the round bit r of the first intermediate result R1 from the arithmetic unit 11 are non-zero value bits, i.e., R1=div 01. The NOR gate 19 serves to output the second postshift data k2 to the postshift circuit 14 when either of the first and second detecting signals d1 and d2 is outputted.

The postshift circuit 14 serves to apply a predetermined quantity of postshift to the second intermediate result R2 from the rounding adder 12 to the right or left in accordance with only the first postshift data k1 ($-1$, 0, $+1$, $+2$, ...) from the shifting part 15 of the PSCE circuit 13 when the second postshift data k2 from the shift correcting part 16 of the PSCE circuit 13 is not received, and to correct postshift in accordance with only the first postshift data k1 from the shifting part 15 by 1 bit to the right when the second postshift data k2 from the shift correcting part 16 is received.

The operation of the mantissa processing circuit having the above-mentioned structure according to the present embodiment will be described in detail. For simplicity, two operands Xa and Xb are positive (a sign bit S=0) floating point numbers. There will separately be described the cases of (1) addition (Xc=Xa+Xb) and (2) subtraction (Xc=Xa−Xb).

(1) Addition (Xc=Xa+Xb)

There will separately be described the cases of (1.1) ea−eb=0 (no preshift), (1.2) ea−eb=1 (1-bit preshift), and (1.3) ea−eb≧2 (2-bit preshift or more).

(1.1) ea−eb=0 (no preshift)

A computational expression is as follows.

|      |   | S u v | M      |     | L g r |
|------|---|-------|--------|-----|-------|
| ma   |   | 0 0 1. | x ... | ... | x 0 0 |
| mb   | + | 0 0 1. | x ... | ... | x 0 0 |
| R1   |   | 0 x x. | x ... | ... | x 0 0 |

Since there is no preshift, the mantissa data ma and mb have the integer part uv of 01 and the guard bit g and round bit r of 00. In this case, the combination of the values of the integer part uv in the first intermediate result (intermediate sum) R1 from the arithmetic unit 11 is limited to 10 to 11.

(1.1.1) uv=10

When the first intermediate result R1 from the arithmetic unit 11 is as follows, it is necessary to execute rounding addition for adding 1 to the least significant bit L of the fraction part and postshift by 1 bit to the right such that n bits including the leading bit v and succeeding bits which are subsequent to the extended bit u of a non-zero value are significant bits.

|      |   | S u v | M      |     | L g r |
|------|---|-------|--------|-----|-------|
| R1   | = | 0 1 0. | x ... | ... | x 0 0 |

On the other hand, the rounding adder 12 of the present embodiment detects that the value of Suv of the first intermediate result R1 is 010 and outputs as a second intermediate result (rounding result) R2 a result obtained by adding 1 to the least significant bit L of the fraction part of the first intermediate result R1. The shifting part 15 of the PSCE circuit 13 detects that the value of the integer part uv of the first intermediate result R1 is 10 and outputs a first postshift data k1 that postshift should be executed by 1 bit to the right. Since R1≠all 1 (vg=00), the first detecting circuit 17 provided in the shift correcting part 16 of the PSCE circuit 13 does not output a first detecting signal d1. Since R1≠div 01 (u=1, gr=00), the second detecting circuit 18 of the shift correcting part 16 does not output a second detecting signal d2. As a result, the postshift circuit 14 shifts the second intermediate result R2 from the rounding adder 12 by 1 bit to the right in accordance with only the first postshift data k1 from the shifting part 15.

(1.1.2) uv=11

The first intermediate result R1 from the arithmetic unit 11 is as follows, it is necessary to execute rounding addition for adding 1 to the least significant bit L of the fraction part and postshift by 1 bit to the right such that n bits including the leading bit v and succeeding bits which are subsequent to the extended bit u of a non-zero value are significant bits.

|      |   | S u v | M      |     | L g r |
|------|---|-------|--------|-----|-------|
| R1   | = | 0 1 1. | x ... | ... | x 0 0 |

When all the values of n bits from the most significant bit M to the least significant bit L of the fraction part of the first intermediate result R1 are 1, a carry may spread over the extended bit u by executing the rounding addition to the least significant bit L. However, even if the mantissa data ma and mb are the maximum values, a computational expression is as follows. In practice, all the bit values of the fraction part of the first intermediate result R1 are not 1. Consequently, it is sufficient that rounding addition for adding 1 to the least significant bit L of the fraction part and postshift by 1 bit to the right are executed.

|      |   | S u v | M      |     | L g r |
|------|---|-------|--------|-----|-------|
| ma   |   | 0 0 1. | 1 ... | ... | 1 0 0 |
| mb   | + | 0 0 1. | 1 ... | ... | 1 0 0 |
| R1   |   | 0 1 1. | 1 ... | ... | 0 0 0 |

On the other hand, the rounding adder 12 of the present embodiment detects that the value of Suv of the first intermediate result R1 is 011 and outputs as a second intermediate result R2 a result obtained by adding 1 to the least significant bit L of the fraction part of the first intermediate result R1. The shifting part 15 of the PSCE circuit 13 detects that the value of the integer part uv of the first intermediate result R1 is 11 and outputs a first postshift data k1 that postshift should be executed by 1 bit to the right. Since R1≠all 1 (g=0), the first detecting circuit 17 provided in the shift correcting part 16 of the PSCE circuit 13 does not output a first detecting signal d1. Since R1≠div 01 (gr=00), the second detecting circuit 18 of the shift correcting part 16 does not output a second detecting signal d2. As a result, the postshift circuit 14 shifts the second intermediate result R2 from the rounding adder 12 by 1 bit to the right in accordance with only the first postshift data k1 from the shifting part 15.

(1.2) ea−eb=1 (1-bit preshift)

A computational expression is as follows.

|      |   | S u v | M      |     | L g r |
|------|---|-------|--------|-----|-------|
| ma   |   | 0 0 1. | x ... | ... | x 0 0 |
| mb   | + | 0 0 0. | 1 ... | ... | x x 0 |
| R1   |   | 0 x x. | x ... | ... | x x 0 |

More specifically, the mantissa data mb of the second operand Xb having the smaller exponent part is preshifted so that the non-zero value of the leading bit v is moved to the most significant bit M of the fraction part and the value of the least significant bit L of the fraction part is moved to the guard bit g. In this case, the combination of the values of the integer part uv and the most significant bit M of the fraction part of the first intermediate result R1 from the arithmetic unit 11 is limited to 011 and 10x.

(1.2.1) uvM=011

When the first intermediate result R1 from the arithmetic unit 11 is as follows, it is necessary to execute rounding addition for adding 1 to the guard bit g and no postshift such that n bits including the most significant bits M and succeeding bits of the fraction part which are subsequent to the leading bit v of a non-zero value are significant bits.

```
        S u v  M         L g r
R1  =   0 0 1. 1 . . .   . . . x x 0
```

However, when (n+2) bits from the leading bit v to the guard bit g of the first intermediate result R1 are non-zero value bits, i.e., R1=all 1, a carry sequentially occurs by adding 1 to the guard bit g. Consequently, it is expected that the second intermediate result R2 outputted from the rounding adder 12 is as follows.

```
        S u v  M         L g r
R2  =   0 1 0. 0 . . .   . . . 0 0 0
```

In that case, it is necessary to postshift the second intermediate result R2 by 1 bit to the right such that n bits including the leading bit v and succeeding bits which are subsequent to the extended bit u of a non-zero value are significant bits.

Referring to the mantissa processing circuit of the present embodiment, in the cases where R1≠all 1 and R1=all 1, operations are different from each other.

When R1≠all 1, the rounding adder 12 of the present embodiment detects that the value of Suv of the first intermediate result R1 is 001 and outputs as the second intermediate result R2 a result obtained by adding 1 to the guard bit g of the first intermediate result R1. The shifting part 15 of the PSCE circuit 13 detects that the value of the integer part uv of the first intermediate result R1 is 01 and outputs the first postshift data k1 that the postshift quantity should be set to 0. Since R1≠all 1, the first detecting circuit 17 provided in the shift correcting part 16 of the PSCE circuit 13 does not output the first detecting signal d1. Since R1≠div 01 (r=0), the second detecting circuit 18 of the shift correcting part 16 does not output the second detecting signal d2. Consequently, the postshift circuit 14 does not postshift the second intermediate result R2 from the rounding adder 12 in accordance with only the first postshift data k1 from the shifting part 15.

When R1=all 1, the rounding adder 12 of the present embodiment detects that the value of Suv of the first intermediate result R1 is 001 and outputs as the second intermediate result R2 a result obtained by adding 1 to the guard bit g of the first intermediate result R1 in similar to the case where R1≠all 1.

```
        S u v  M         L g r
R2  =   0 1 0. 0 . . .   . . . 0 0 0
```

The shifting part 15 of the PSCE circuit 13 detects that the value of the integer part uv of the first intermediate result R1 is 01 and outputs the first postshift data k1 that the postshift quantity should be set to 0 in similar to the case where R1≠all 1. Since R1=all 1, the first detecting circuit 17 provided in the shift correcting part 16 of the PSCE circuit 13 outputs the first detecting signal d1. Consequently, the second postshift data k2 that additional postshift should be executed by 1 bit to the right is given to the postshift circuit 14. Accordingly, the postshift circuit 14 properly postshifts the second intermediate result R2 from the rounding adder 12 by 1 bit to the right in accordance with the first postshift data k1 from the shifting part 15 and the second postshift data k2 from the shift correcting part 16.

(1.2.2) uvM=10x

When the first intermediate result R1 from the arithmetic unit 11 is as follows, it is necessary to execute rounding addition for adding 1 to the least significant bit L of the fraction part and postshift by 1 bit to the right such that n bits including the leading bit v and succeeding bits which are subsequent to the extended bit u of a non-zero value are significant bits.

```
        S u v  M         L g r
R1  =   0 1 0. x . . .   . . . x x 0
```

Since the operation of the mantissa processing circuit according to the present embodiment is almost the same as in the above-mentioned (1.1.1), its description will be omitted.

(1.3) ea−eb≧2 (2-bit preshift or more)

A computational expression is as follows.

```
        S u v  M         L g r
ma      0 0 1. x . . .   . . . x 0 0
mb   +  0 0 0. 0 . . .   . . . x x x
R1      0 x x. x . . .   . . . x x x
```

More specifically, the mantissa data mb of the second operand Xb having the smaller exponent part is preshifted so that the non-zero value of the leading bit v,- i.e., 1 enters the fraction part and the value of the least significant bit L of the fraction part sequentially goes out through the guard bit g and the round bit r. In this case, the combination of the value of the integer part uv and the most significant bit M of the fraction part of the first intermediate result R1 from the arithmetic unit 11 is limited to 01x and 100.

(1.3.1) uvM=01x

When the first intermediate result R1 from the arithmetic unit 11 is as follows, it is necessary to execute rounding addition for adding 1 to the guard bit g and to adjust the postshift quantity according to whether there is at least a zero value bit of 1 bit in (n+2) bits from the leading bit v to the guard bit g of the first intermediate result R1 (R1≠all 1) or whether all the (n+2) bits are non-zero value bits (R1=all 1) in similar to the above-mentioned (1.2.1).

```
        S u v  M         L g r
R1  =   0 0 1. x . . .   . . . x x x
```

Since the operation of the mantissa processing circuit according to the present embodiment is almost the same as in the above-mentioned (1.2.1), its description will be omitted.

(1.3.2) uvM=100

When the first intermediate result R1 from the arithmetic unit 11 is as follows, it is necessary to execute rounding addition for adding 1 to the least significant bit L of the fraction part and postshift by 1 bit to the right such that n bits including the leading bit v and succeeding bits which are subsequent to the extended bit u of a non-zero value are significant bits.

```
         S u v   M            L g r
R1  =    0 1 0.  0 . . .  . . . x x x
```

Since the operation of the mantissa processing circuit according to the present embodiment is almost the same as in the above-mentioned (1.1.1), its description will be omitted.

(2) Subtraction (Xc=Xa−Xb)

There will separately be described the cases of (2.1) ea−eb=0 (no preshift), (2.2) ea−eb=1 (1-bit preshift), and (2.3) ea−eb≧2 (2-bit preshift or more).

(2.1) ea−eb=0 (no preshift)

A computational expression is as follows.

```
         S u v   M             L g r
ma       0 0 1.  x . . .  . . . x 0 0
mb   −   0 0 1.  x . . .  . . . x 0 0
R1       x x x.  x . . .  . . . x 0 0
```

The arithmetic unit 11 executes the following addition in place of the above-mentioned subtraction.

```
         S u v   M             L g r
ma       0 0 1.  x . . .  . . . x 0 0
mb'      1 1 0.  x . . .  . . . x 1 1
     +                              1
R1       x x x.  x . . .  . . . x 0 0
```

More specifically, all the values of (n+5) bits of the second mantissa data mb as a subtrahend are inverted (the result of inversion is mb'). Then, the result of inversion mb' is added to the first mantissa data ma as a minuend and 1 is added to the round bit r. A result obtained by adding 2's complement of the second mantissa data mb to the first mantissa data ma is outputted as the first intermediate result (intermediate sum) R1. In this case, the combination of the values of the sign bit S and the integer part uv of the first intermediate result R1 in the above-mentioned adding expression is limited to 000 and 111. In the case where Suv=111, the result of subtraction is a negative value (the sign bit S=1) so that the arithmetic unit 11 executes inversion for positive-numbering. More specifically, the values of (n+4) bits other than the sign bit S of the result of subtraction are inverted. The values thus inverted are outputted as the first intermediate result R1. Accordingly, the combination of the values of the sign bit S and the integer part uv of the first intermediate result R1 from the arithmetic unit 11 is limited to 000 and 100.

```
         S u v   M             L g r
R1  =    1 0 0.  x . . .  . . . x 1 1
```

(2.1.1) Suv=000

When the first intermediate result R1 from the arithmetic unit 11 is as follows, it is necessary to set n bits subsequent to the first non-zero value bit in the fraction part to significant bits. For example, when the most significant bit M of the fraction part is a non-zero value bit, it is necessary to execute rounding addition for adding 1 to the round bit r and postshift by 1 bit to the left such that n bits from the most significant bit M to the guard bit g are significant bits. When the most significant bit M of the fraction part is a zero value bit and a bit in the lower order by 1 bit is a non-zero value bit, it is necessary to postshift n bits up to the round bit r by 2 bits to the left such that the n bits are significant bits. However, it is not necessary to execute rounding addition.

```
         S u v   M             L g r
R1  =    0 0 0.  x . . .  . . . x 0 0
```

The rounding adder 12 of the present embodiment outputs as the second intermediate result R2 a result obtained by adding 1 to the round bit r of the first intermediate result R1 when it is detected that the value of SuvM of the first intermediate result R1 is 0001, and the first intermediate result R1 when it is detected that the value of SuvM of the first intermediate result R1 is 0000. The shifting part 15 of the PSCE circuit 13 detects that the value of the integer part uv of the first intermediate result R1 is 00, sequentially counts the number of the zero value bits including the leading bit v from the leading bit v to the first non-zero value bit of the first intermediate result R1 in the low order direction, and outputs the first postshift data k1 that the number of the zero value bits should be a shift quantity to the left. Since R1≠all 1 (vg=00), the first detecting circuit 17 provided in the shift correcting part 16 of the PSCE circuit 13 does not output the first detecting signal d1. Since R1≠div 01 (gr=00), the second detecting circuit 18 of the shift correcting part 16 does not output the second detecting signal d2. Consequently, the postshift circuit 14 shifts the second intermediate result R2 from the rounding adder 12 by a predetermined bit number to the left in accordance with only the first postshift data k1 from the shifting part 15.

(2.1.2) Suv=100

When the first intermediate result R1 from the arithmetic unit 11 is as follows (the first intermediate result R1 has been inverted for positive-numbering), it is necessary to execute rounding addition for adding 1 to the round bit r of the first intermediate result R1 so as to complete the processing of rounding and positive-numbering and set to significant bits n bits subsequent to the first non-zero value bit in the fraction part. When bits other than continuous zero value bits subsequent to the extended bit u (n+4) bits from the extended bit u to the round bit r of the first intermediate result R1 are non-zero bits, i.e., R1=div 01, 1 is added to the round bit r so that a carry sequentially occurs.

```
         S u v   M             L g r
R1  =    1 0 0.  x . . .  . . . x 1 1
```

By way of example, when the first intermediate result R1 is as follows, 1 is added to the round bit r so that the carry sequentially occurs.

```
        S u v  M           L g r
R1  =   1 0 0. 0 ... 0 0 1 1 ... 1 1 1
```

Consequently, it is expected that the following second intermediate result R2 is outputted from the rounding adder 12 so that the position of the first non-zero value bit in the fraction part is moved by 1 bit to the left. Accordingly, when R1=div 01, it is necessary to decrease a left shift quantity by 1 bit as compared with postshift in the case where R1≠div 01.

```
        S u v  M           L g r
R2  =   1 0 0. 0 ... 0 1 0 0 ... 0 0 0
```

Referring to the mantissa processing circuit of the present embodiment, in the cases where R1≠div 01 and R1=div 01, operations are different from each other.

When R1≠div 01, the rounding adder 12 of the present embodiment detects that the value of the sign bit S of the first intermediate result R1 from the arithmetic unit 11 is 1 and outputs as the second intermediate result R2 a result obtained by adding 1 to the round bit r of the first intermediate result R1. The shifting part 15 of the PSCE circuit 13 detects that the value of the integer part uv of the first intermediate result R1 from the arithmetic unit 11 is 00, sequentially counts the number of the zero value bits including the leading bit v from the leading bit v to the first non-zero value bit of the first intermediate result R1 in the low order direction, and outputs the first postshift data k1 that the number of the zero value bits should be a shift quantity to the left in similar to the above-mentioned (2.1.1). Since R1≠all 1 (v=0), the first detecting circuit 17 provided in the shift correcting part 16 of the PSCE circuit 13 does not output the first detecting signal d1. Since R1≠div 01, the second detecting circuit 18 of the shift correcting part 16 does not output the second detecting signal d2. Consequently, the postshift circuit 14 postshifts the second intermediate result R2 from the rounding adder 12 to the left in accordance with only the first postshift data k1 from the shifting part 15.

When R1=div 01, the rounding adder 12 of the present embodiment detects that the value of the sign bit S of the first intermediate result R1 is 1 and adds 1 to the round bit r of the first intermediate result R1 in similar to the case where R1 !b div 01. Accordingly, the second intermediate result R2 in which the position of the first non-zero value bit is moved is outputted from the rounding adder 12. The shifting part 15 of the PSCE circuit 13 detects that the value of the integer part uv of the first intermediate result R1 is 00 and outputs the first postshift data k1 having the same contents as in the case where R1 !b div 01. More specifically, there is made a difference between a quantity of postshift to be actually applied to the second intermediate result R2 from the rounding adder 12 and a quantity of postshift specified by the first postshift data k1. Since R1=div 01, however, the second detecting circuit 18 provided in the shift correcting part 16 of the PSCE circuit 13 outputs the second detecting signal d2. As a result, the second postshift data k2 that additional postshift should be executed by 1 bit to the right is given to the postshift circuit 14. Accordingly, the difference between the shift quantities is eliminated. Consequently, the postshift circuit 14 executes proper postshift.

(2.2) ea−eb=1 (1-bit preshift)
A computational expression is as follows.

```
       S u v  M           L g r
ma     0 0 1. x ... ...   x 0 0
mb   − 0 0 0. 1 ... ...   x x 0
R1     x x x. x ... ...   x x 0
```

The arithmetic unit 11 executes the following addition in place of the above-mentioned subtraction.

```
       S u v  M           L g r
ma     0 0 1. x ... ...   x 0 0
mb'    1 1 1. 0 ... ...   x x 1
     +                          1
R1     x x x. x ... ...   x x 0
```

In this case, the combination of the values of the sign bit S, the integer part uv and the most significant bit M of the fraction part in the first intermediate result R1 from the arithmetic unit 11 is limited to 0010, 0001 and 0000.

(2.2.1) SuvM=0010

When the first intermediate result R1 from the arithmetic unit 11 is as follows, it is necessary to execute rounding addition for adding 1 to the guard bit g in similar to the above-mentioned (1.2.1). Since R1 !b all 1 (M=0), it is not necessary to adjust a quantity of postshift.

```
        S u v  M           L g r
R1  =   0 0 1. 0 ... ...   x x 0
```

Since the operation of the mantissa processing circuit according to the present embodiment is almost the same as in the above-mentioned (1.2.1), its description will be omitted.

(2.2.2) SuvM=0001

When the first intermediate result R1 from the arithmetic unit 11 is as follows, it is necessary to execute rounding addition for adding 1 to the round bit r.

```
        S u v  M           L g r
R1  =   0 0 0. 1 ... ...   x x 0
```

(2.2.3) SuvM=0000

When the first intermediate result R1 from the arithmetic unit 11 is as follows, it is not necessary to execute rounding addition.

```
        S u v  M           L g r
R1  =   0 0 0. 0 ... ...   x x 0
```

Since the operation of the mantissa processing circuit according to the present embodiment corresponding to (2.2.2) and (2.2.3) is almost the same as in the above-mentioned (2.1.1), its description will be omitted.

(2.3) ea−eb !f 2 (2-bit preshift or more)
A computational expression is as follows.

|    | S u v | M    |     | L g r |
|----|-------|------|-----|-------|
| ma |  0 0 1. | x... | ... | x 0 0 |
| mb − |  0 0 0. | 0... | ... | x x x |
| R1 |  x x x. | x... | ... | x x x |

The arithmetic unit 11 executes the following addition in place of the above-mentioned subtraction.

|    | S u v | M    |     | L g r |
|----|-------|------|-----|-------|
| ma |  0 0 1. | x... | ... | x 0 0 |
| mb' |  1 1 1. | 1... | ... | x x x |
| +  |       |      |     |     1 |
| R1 |  x x x. | x... | ... | x x x |

In this case, the combination of the values of the sign bit S, the integer part uv and the most significant bit M of the fraction part in the first intermediate result R1 from the arithmetic unit 11 is limited to 001x and 0001.

(2.3.1) SuvM=001x

When the first intermediate result R1 from the arithmetic unit 11 is as follows, it is necessary to execute rounding addition for adding 1 to the guard bit g in similar to the above-mentioned (1.2.1). At least 1 bit of (n+1) bits from the most significant bit M to the guard bit g of the fraction part is a zero value bit. In other words, there is no case where R1=all 1. Consequently, it is not necessary to adjust a quantity of postshift.

|    | S u v | M    |     | L g r |
|----|-------|------|-----|-------|
| R1 = |  0 0 1. | x... | ... | x x x |

Since the operation of the mantissa processing circuit according to the present embodiment is almost the same as in the above-mentioned (1.2.1), its description will be omitted.

(2.3.2) SuvM=0001

When the first intermediate result R1 from the arithmetic unit 11 is as follows, it is necessary to execute rounding addition for adding 1 to the round bit r so as to set to significant bits n bits subsequent to the most significant bit M which is the first non-zero value bit in the fraction part of the first intermediate result R1, and to adjust a quantity of postshift according to whether R1=div 01 with respect to (n+4) bits from the extended bit u to the round bit r of the first intermediate result R1.

|    | S u v | M    |     | L g r |
|----|-------|------|-----|-------|
| R1 = |  0 0 0. | 1... | ... | x x x |

The operation of the mantissa processing circuit of the present embodiment is as follows. When R1 !b div 01, the rounding adder 12 of the present embodiment detects that the value of SuvM of the first intermediate result R1 from the arithmetic unit 11 is 0001 and outputs as the second intermediate result R2 a result obtained by adding 1 to the round bit r of the first intermediate result R1. The shifting part 15 of the PSCE circuit 13 detects that the value of the integer part uv of the first intermediate result R1 from the arithmetic unit 11 is 00, sequentially counts the number of the zero value bits including the leading bit v from the leading bit v to the first non-zero value bit of the first intermediate result R1 in the low order direction, and outputs the first postshift data k1 that the number of the zero value bits, i.e., 1 should be a shift quantity to the left in similar to the above-mentioned (2.1.1). Since R1 !b all 1 (v=0), the first detecting circuit 17 provided in the shift correcting part 16 of the PSCE circuit 13 does not output the first detecting signal d1. Since R1 !b div 01, the second detecting circuit 18 of the shift correcting part 16 does not output the second detecting signal d2. Consequently, the postshift circuit 14 shifts the second intermediate result R2 from the rounding adder 12 by 1 bit to the left in accordance with only the first postshift data k1 from the shifting part 15.

When R1=div 01, the rounding adder 12 of the present embodiment detects that the value of SuvM of the first intermediate result R1 is 0001 and adds 1 to the round bit r of the first intermediate result R1 in similar to the case where R1 !b div 01. Accordingly, the second intermediate result R2 in which the position of the first non-zero value bit is moved from the most significant bit M to the leading bit v of the fraction part is outputted from the rounding adder 12. The shifting part 15 of the PSCE circuit 13 detects that the value of the integer part uv of the first intermediate result R1 is 00 and outputs the first postshift data k1 that shift should be executed by 1 bit to the left in similar to the case where R1 !b div 01. Since R1=div 01, the second detecting circuit 18 provided in the shift correcting part 16 of the PSCE circuit 13 outputs the second detecting signal d2 so that the second postshift data k2 that additional postshift should be executed by 1 bit to the right is given to the postshift circuit 14. Accordingly, the postshift circuit 14 does not postshift the second intermediate result R2 from the rounding adder 12.

For simplicity, two operands Xa and Xb are positive floating point numbers and the value of the exponent part ea of a first operand Xa is equal to or more than that of the exponent part eb of a second operand Xb. According to the mantissa processing circuit of the present embodiment, furthermore, proper postshift is always executed. Also in other cases, the foregoing is applied. According to the present embodiment, the proper postshift is always executed in any case. In addition, postshift-count-encoding is executed in parallel with rounding addition based on the first intermediate result R1 from the arithmetic unit 11. Consequently, the processing speeds of rounding and normalization for the first intermediate result R1 can be enhanced.

Figure 2:
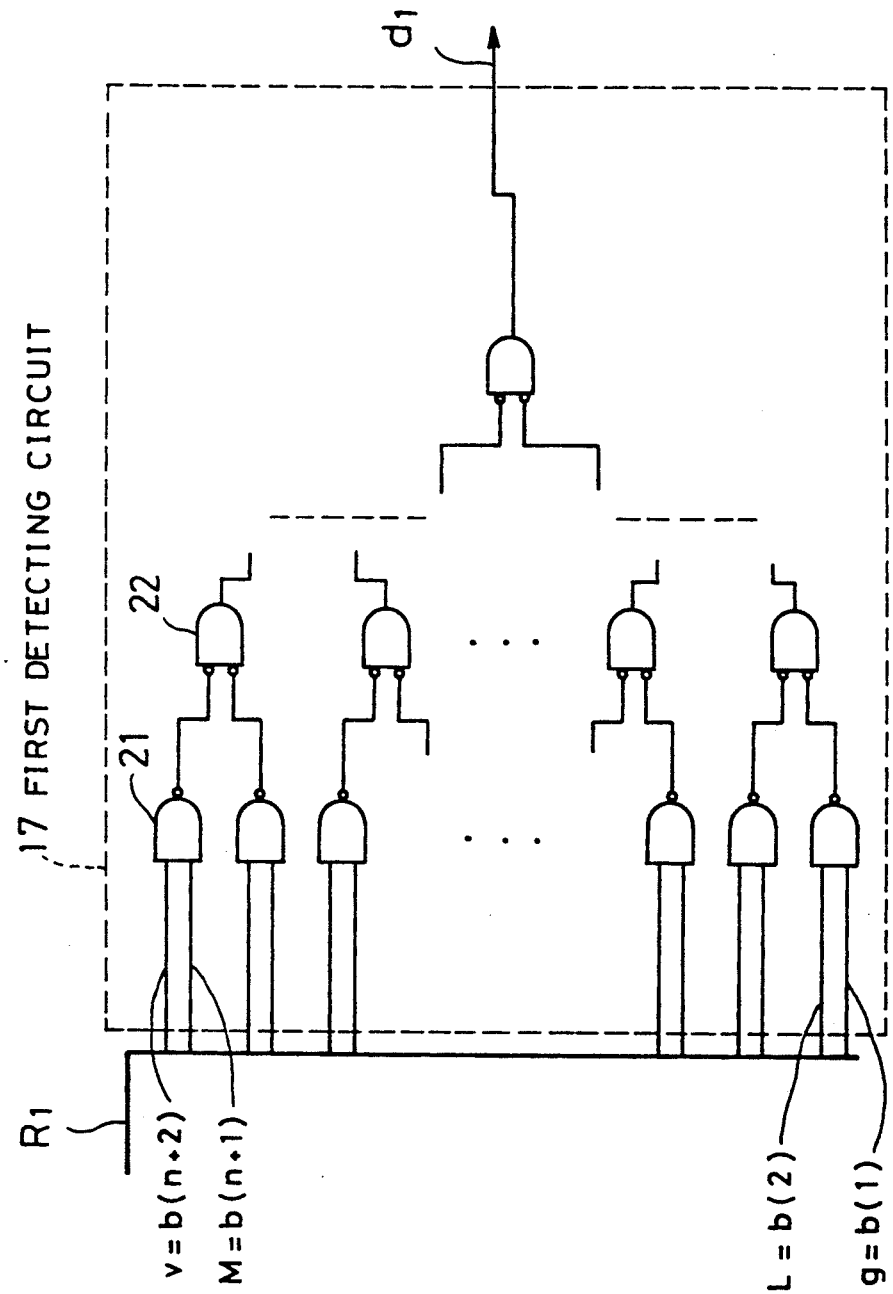
FIG. 2 is a detailed circuit diagram of a first detecting circuit shown in FIG. 1.
Figure 3:
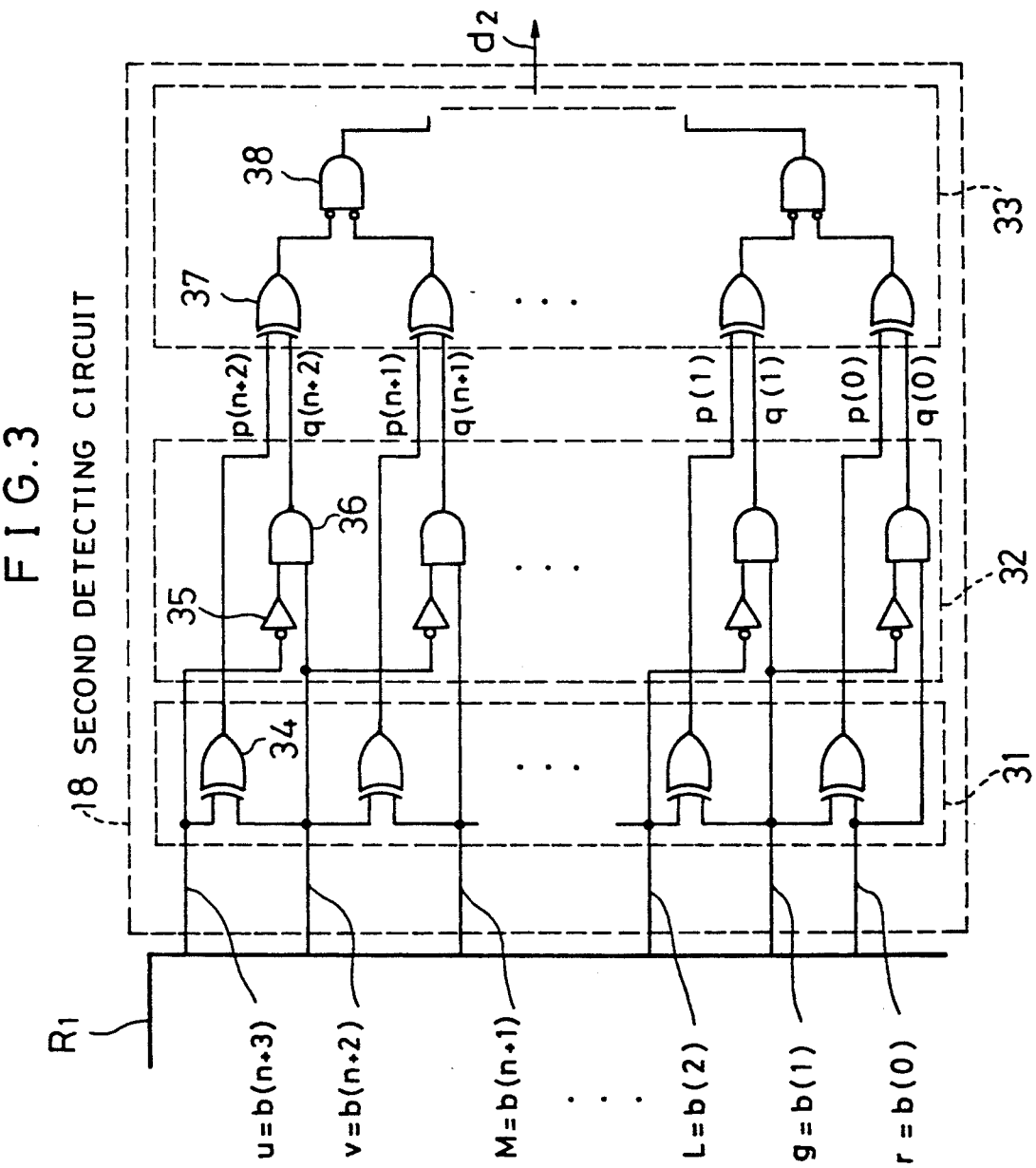
FIG. 3 is a detailed circuit diagram of a second detecting circuit shown in FIG. 1.
Figure 4:
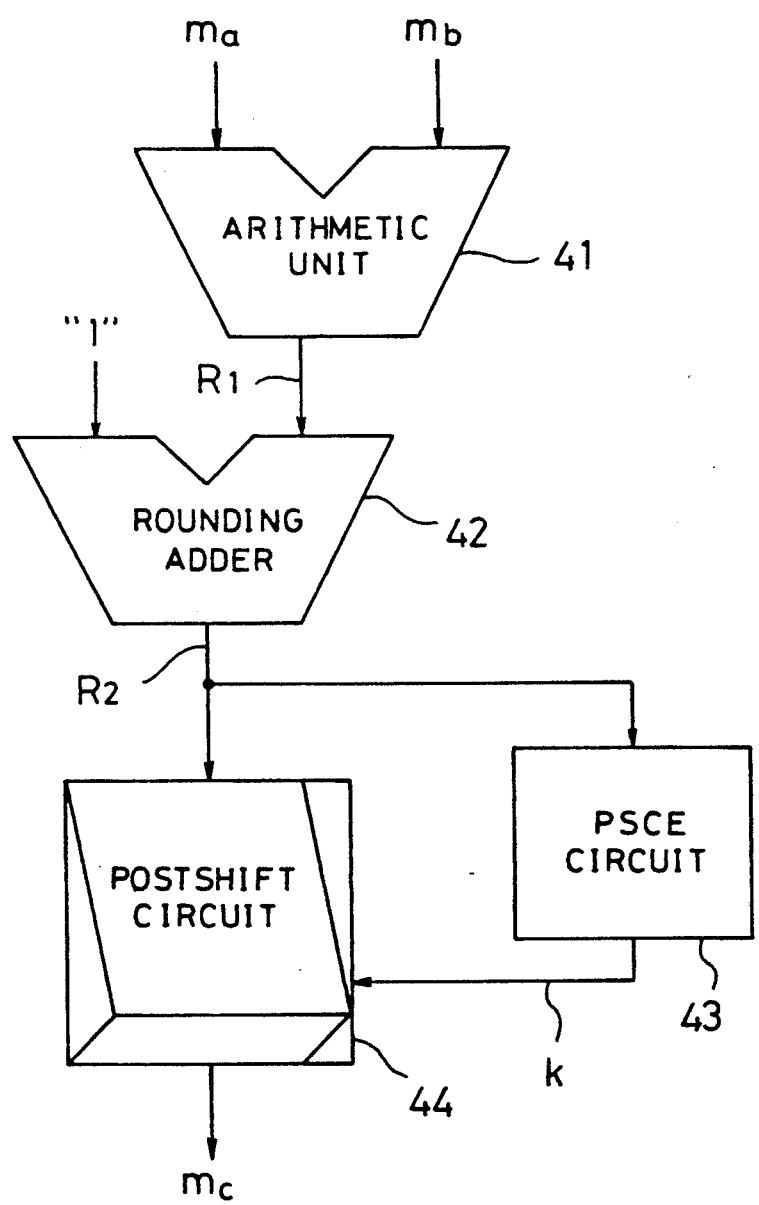
FIG. 4 is a block diagram showing an example of a mantissa processing circuit according to the prior art.

FIGS. 2 and 3 show the specific structures of the first and second detecting circuits 17 and 18 provided in the shift correcting part 16 of the PSCE circuit 13. In FIGS. 2 and 3, bit values b (i) (i=n+3 to 0) of (n+4) bits are defined such that the value of the most significant extended bit u of (n+4) bits from the extended bit u to the round bit r of the first intermediate result R1 is represented by b (n+3) and the value of the least significant round bit r is represented by b (0) with the use of the bit number n of the fraction part in the first intermediate result R1 from the arithmetic unit 11.

As shown in FIG. 2, the first detecting circuit 17 has a structure in which a plurality of 2-input NAND gates 21 and a plurality of 2-input NOR gates 22 are combined. Consequently, it can be detected whether all the values of (n+2) bits from the leading bit v to the guard bit g of the first intermediate result R1, i.e., b (i) are 1 (i=n+2 to 1). More specifically, it can be detected whether R1=all 1. Only in the case where R1=all 1, the logical value of the first detecting signal d1 is 1.

As shown in FIG. 3, the second detecting circuit 18 includes logic circuits 31 to 33. The first logic circuit 31 has (n+3) EXCLUSIVE-OR gates 34 in which an output bit value p (i) is 1 when b (i+1) does not correspond to b (i), and the output bit value p (i) is 0 when b (i+1) corresponds to b (i) (i=n+2 to 0). The second logic circuit 32 has (n+3) NOT gates 35 and (n+3) 2-input AND gates 36. When b (i+1) is 0 and b (i) is 1 (i=n+2 to 0), an output bit value q (i) is 1. In other cases, the output bit value q (i) is 0. The third logic circuit 33 has (n+3) EXCLUSIVE-OR gates 37, a combinational circuit provided with 2-input NOR gates 38, 2-input NAND gates and NOT gates (not shown). Referring to the 2-input NOR gate 38, the logical value of the second detecting signal d2 is 1 only in the case where all the outputs of the (n+3) EXCLUSIVE-OR gates 37 are 0. Referring to the third logic circuit 33, it is assumed that bits other than continuous zero value bits including the extended bit u and succeeding bits among (n+4) bits from the extended bit u to the round bit r of the first intermediate result R1 from the arithmetic unit 11 are non-zero value bits, i.e., R1=div 01 only in the case where the output bit value p (i) (i=n+2 to 0) of the first logic circuit 31 corresponds to the output bit value q (i) of the second logic circuit 32. In other words, it is assumed that R1=div 01 so that the logical value of the second detecting signal d2 is 1.

The output bit values p (i) and q (i) can be represented by the following logical expressions.

$$p(i) = b(i+1) \text{ EOR } b(i)$$

$$q(i) = (b(i+1)=0) \text{ AND } (b(i)=1)$$

where i=n+2 to 0.

There will be described a specific example of the operation of the second detecting circuit 18 having the above-mentioned structure. For simplicity, a bit number n from the most significant bit M to the least significant bit L of the fraction part of the first intermediate result R1 is 6.

(1) R1=div 01

EXAMPLE 1

| i | (9) | (8) | (7) | (6) | (5) | (4) | (3) | (2) | (1) | (0) |
|---|---|---|---|---|---|---|---|---|---|---|
| b (i) | 0 | 0 | 0 | 0 | 1 | 1 | 1 | 1 | 1 | 1 |
| p (i) |   | 0 | 0 | 0 | 1 | 0 | 0 | 0 | 0 | 0 |
| q (i) |   | 0 | 0 | 0 | 1 | 0 | 0 | 0 | 0 | 0 |

In this case, p (i)=q (i) (i=8 to 0). The logical value of the second detecting signal d2 is 1.

(2) R1 ≠ div 01

EXAMPLE 2

| i | (9) | (8) | (7) | (6) | (5) | (4) | (3) | (2) | (1) | (0) |
|---|---|---|---|---|---|---|---|---|---|---|
| b (i) | 0 | 0 | 0 | 0 | 1 | 1 | 0 | 0 | 1 | 1 |
| p (i) |   | 0 | 0 | 0 | 1 | 0 | 1 | 0 | 1 | 0 |
| q (i) |   | 0 | 0 | 0 | 1 | 0 | 0 | 0 | 1 | 0 |

In this case, p (3) ≠ q (3). Consequently, the logical value of the second detecting signal d2 is 0.

EXAMPLE 3

| i | (9) | (8) | (7) | (6) | (5) | (4) | (3) | (2) | (1) | (0) |
|---|---|---|---|---|---|---|---|---|---|---|
| b (i) | 0 | 0 | 0 | 0 | 1 | 0 | 0 | 0 | 0 | 0 |
| p (i) |   | 0 | 0 | 0 | 1 | 1 | 1 | 0 | 0 | 0 |
| q (i) |   | 0 | 0 | 0 | 1 | 0 | 0 | 0 | 0 | 0 |

In this case, p (4) ≠ q (4) and p (3) ≠ q (3). Consequently, the logical value of the second detecting signal d2 is 0.

As described above, the second detecting circuit 18 shown in FIG. 3 can detect whether R1=div 01. In addition, the first and second detecting circuits 17 and 18 shown in FIGS. 2 and 3 can be realized on a fully small scale as compared with the shifting part 15 of the PSCE circuit 13.

Figure 5:
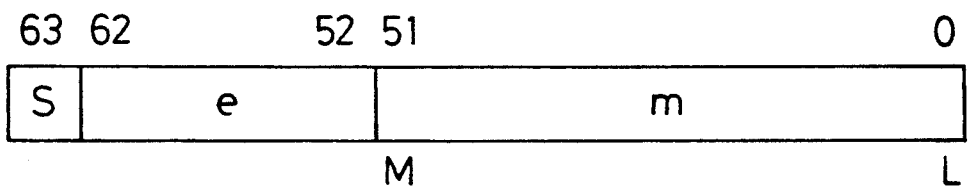
FIG. 5 is a view conceptually showing an example of the format of a normalized floating point number.

Also in the case where the sticky bit s is added to the lower order than the round bit r as shown in FIG. 5, the present invention can be applied. In this case, a value of 0 is first set to the sticky bit s as well as the guard bit g and round bit r and the mantissa parts of n bits of two operands are treated as the mantissa data ma and mb having a data structure of (n+6) bits. The mantissa data ma and mb are preshifted for bit alignment such that the non-zero value of the leading bit v of either of the mantissa data of the operands enters the fraction part m of the mantissa data, the value of the least significant bit L of the fraction part m sequentially goes out to the guard bit g and round bit r of the mantissa data, and such that the value of the sticky bit s of the mantissa data is set to 1 when there is a bit-discard from the round bit r. Then, the mantissa data ma and mb are given as input data to the arithmetic unit 11. The arithmetic unit 11 executes binary addition and substraction on (n+6) bits of the received mantissa data, executes inversion for positive-numbering on the result of addition and substraction in similar to the foregoing, and outputs the first intermediate result R1 having the data structure of (n+6) bits.

Thus, in the case where the sticky bit s is introduced, the rounding adder 12 outputs a result obtained by adding 1 to the least significant bit L of the fraction part m of the first intermediate result R1 from the arithmetic unit 11 as the second intermediate result R2 to the post-shift circuit 14 when the value of the sign bit S of the first intermediate result R1 is 0, the value of the integer part uv of the first intermediate result R1 is 10 or 11, and the logical sum of the values of the guard bit g, round bit r and sticky bit s of the first intermediate result R1 is 1, or when the value of the sign bit S of the first intermediate result R1 is 0, the value of the integer part uv of the first intermediate result R1 is 10 or 11, the logical sum of the values of the guard bit g, round bit r and sticky bit s of the first intermediate result R1 is 0, and the value of a bit in the higher order than the least significant bit L of the fraction part m of the first intermediate result R1 by 1 bit is 1. The rounding adder 12 outputs a result obtained by adding 1 to the guard bit g of the first intermediate result R1 from the arithmetic unit 11 as the second intermediate result R2 to the post-shift circuit 14 when the value of the sign bit S of the first intermediate result R1 is 0, the value of the integer part uv of the first intermediate result R1 is 01, and the logical sum of the values of the round bit r and sticky bit s of the first intermediate result R1 is 1, or when the value of the sign bit S of the first intermediate result R1 is 0, the value of the integer part uv of the first intermediate result R1 is 01, the logical sum of the values of the round bit r and sticky bit s of the first intermediate result R1 is 0, and the value of the least significant bit L of the fraction part m of the first intermediate result R1 is 1. The rounding adder 12 outputs a result obtained by adding 1 to the round bit r of the first intermediate result R1 from the arithmetic unit 11 as the second intermediate result R2 to the postshift circuit 14 when the value of the sign bit S of the first intermediate result R1 is 0, the value of the integer part uv of the first intermediate result R1 is 00, the value of the most significant bit M of the fraction part m of the first intermediate result R1 is 1, and the value of the sticky bit s of the first intermediate result R1 is 1, when the value of the sign bit S of the first intermediate result R1 is 0, the value of the integer part uv of the first intermediate result R1 is 00, the value of the most significant bit M of the fraction part m of the first intermediate result R1 is 1, the value of the sticky bit s of the first intermediate result R1 is 0, and the value of the guard bit g of the first intermediate result R1 is 1, or when the value of the sign bit S of the first intermediate result R1 is 1. In other cases, the rounding adder 12 outputs the first intermediate result R1 from the arithmetic unit 11 as the second intermediate result R2 to the postshift circuit 14.

Even if the sticky bit s is introduced, it is not necessary to change the structures of the shifting part 15 and shift correcting part 16 of the PSCE circuit 13. More specifically, it is not necessary to change the structure of the first detecting circuit 17 for examining whether R1=all 1 with respect to (n+2) bits from the leading bit v to the guard bit g of the first intermediate result R1 from the arithmetic unit 11, and that of the second detecting circuit 18 for examining whether R1=div 01 with respect to (n+4) bits from the extended bit u to the round bit r of the first intermediate result R1 from the arithmetic unit 11.

According to the above-mentioned embodiment, the arithmetic unit 11 has the function of inversion for positive-numbering on the result of addition and subtraction when the result of addition and subtraction in the arithmetic unit 11 is negative value. In other words, the arithmetic unit 11 has an inverting circuit for positive-numbering built-in. In the case where the rounding adder 12 conventionally has the inverting circuit for positive-numbering, it is sufficient that the same inverting circuit is also provided in the PSCE circuit 13 so as to distribute the output of the inverting circuit in the PSCE circuit 13 to the shifting part 15 and the shift correcting part 16.

While the second detecting circuit 18 examines whether data is "divided" with respect to (n+4) bits from the extended bit u to the round bit r of the first intermediate result R1 in the above-mentioned embodiment, it may examine whether bits other than continuous zero value bits including the leading bit v and succeeding bits among (n+3) bits from the leading bit v to the round bit r of the first intermediate result R1 are non-zero value bits irrespective of the introduction of the sticky bit s. In this case, the postshift circuit 14 has a structure in which the second postshift data k2 from the shift correcting part 16 of the PSCE circuit 13 is ignored when the value of the first postshift data k1 from the shifting part 15 of the PSCE circuit 13 is a negative number or 0.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

I claim:

1. A mantissa processing circuit for executing the addition and subtraction of mantissa parts of two operands and for performing rounding and normalization for the result of addition and subtraction of the mantissa parts in a floating point arithmetic apparatus for addition and subtraction which receives two floating point numbers as the operands, each floating point number having a sign bit, an exponent part and the mantissa part of n bits and being normalized, comprising:

an arithmetic unit for receiving the mantissa parts of the operands as input data wherein the mantissa part of the one of the operands which has the smaller exponent part than that of the other is preshifted in the low order direction by a bit number equal to the difference between the values of the exponent parts of the operands when the values of the exponent parts do not correspond to each other, receiving the mantissa parts of the operands as input data which are not preshifted when the values of the exponent parts of the operands correspond to each other, executing binary addition and subtraction on two input data thus received, and outputting the results of binary addition and subtraction as a first intermediate result, a rounding adder for executing rounding addition of adding 1 to a bit of the first intermediate result as demanded from said arithmetic unit and outputting the result of rounding addition as a second intermediate result, a postshift-count-encode circuit coupled to the first intermediate result from said arithmetic unit for generating data on the direction and quantity of postshift to be applied to the second intermediate result from said rounding adder for normalization, including a shifting part for sequentially searching for a first non-zero value bit in the low order direction from the highest order bit of the first intermediate result from said arithmetic unit, generating data on the direction and quantity of postshift according to the position of the first non-zero value bit thus obtained, and giving to said postshift circuit the generated data as a first postshift data and a shift correcting part for giving to said postshift circuit a second postshift data that additional postshift should be executed by 1 bit in the low order direction when it is expected that the position of the first non-zero value bit of the first intermediate result from said arithmetic unit is moved by 1 bit in the high order direction for rounding addition executed by said rounding adder and outputting the data thus generated as a postshift data, and a postshift circuit for shifting the second intermediate result from said rounding adder in the high or low order direction in accordance with the postshift data from said postshift-count-encode circuit, and outputting the result of shift as the mantissa part of a calculation result.

2. A mantissa processing circuit of a floating point arithmetic apparatus for addition and subtraction according to claim 1, wherein said arithmetic unit has the function of receiving as the input data two mantissa data, each mantissa data having a data structure of ($n+5$) bits including the respective mantissa part of the operand as a fraction part of n bits in which the sign bit of the operand and an extended bit and a leading bit forming an integer part of 2 bits are sequentially added to the higher order than the most significant bit of the respective mantissa part of the operand in the low order direction, and a guard bit and a round bit are sequentially added to the lower order than the least significant bit of the respective mantissa part of the operand in the low order direction, and in which a value of 01 is set to the integer part formed by the extended bit and leading bit of the respective mantissa data, a value of 0 is set to the guard bit and round bit of the respective mantissa data, and preshift is applied as necessary such that the non-zero value of the leading bit of either of the mantissa data enters the fraction part of the mantissa data and the value of the least significant bit of the fraction part sequentially goes out to the guard bit and round bit of the mantissa data, executing binary addition and subtraction on ($n+5$) bits of the mantissa data thus received, and outputting as the first intermediate result having a data structure of ($n+5$) bits which is the same as in the mantissa data a result obtained by inverting the values of bits other than the sign bit of the result of addition and subtraction when the value of the sign bit of the result of addition and subtraction is 1, and the result of addition and subtraction when the value of the sign bit of the result of addition and subtraction is 0, said rounding adder has the function of outputting as the second intermediate result to said postshift circuit a result obtained by adding 1 to the least significant bit of the fraction part of the first intermediate result from said arithmetic unit when the value of the sign bit of the first intermediate result is 0 and the value of the integer part of the first intermediate result is 10 or 11, a result obtained by adding 1 to the guard bit of the first intermediate result from said arithmetic unit when the value of the sign bit of the first intermediate result is 0 and the value of the integer part of the first intermediate result is 01, a result obtained by adding 1 to the round bit of the first intermediate result from said arithmetic unit when the value of the sign bit of the first intermediate result is 0, the value of the integer part of the first intermediate result is 00, and the value of the most significant bit of the fraction part of the first intermediate result is 1, or when the value of the sign bit of the first intermediate result is 1, and the first intermediate result from said arithmetic unit in other cases, said shifting part of the postshift-count-encode circuit has the function of outputting as the first postshift data to said postshift circuit data that postshift should be executed by 1 bit in the low order direction when the value of the integer part of the first intermediate result from said arithmetic unit is 10 or 11, data that a quantity of postshift should be 0 when the value of the integer part of the first intermediate result from said arithmetic unit is 01, and data that the number of zero value bits including the leading bit from the leading bit to the first non-zero value bit of the first intermediate result from said arithmetic unit in the low order direction should be a shift quantity in the high order direction when the value of the integer part of the first intermediate result is 00, and said shift correcting part of the postshift-count-encode circuit has a first detecting circuit for outputting a first detecting signal when ($n+2$) bits from the leading bit to the guard bit of the first intermediate result from said arithmetic unit are non-zero value bits, a second detecting circuit for outputting a second detecting signal when bits other than continuous zero value bits including the extended bit among ($n+4$) bits from the extended bit to the round bit of the first intermediate result from said arithmetic unit are non-zero value bits, and the function of outputting the second postshift data to said postshift circuit when either of the first and second detecting signals is outputted.

3. A mantissa processing circuit of a floating point arithmetic apparatus for addition and subtraction according to claim 1, wherein said arithmetic unit has the function of receiving as the input data two mantissa data, each mantissa data having a data structure of ($n+6$) bits including the respective mantissa part of the operand as a fraction part of n bits in which the sign bit of the operand and an extended bit and a leading bit forming an integer part of 2 bits are sequentially added to the higher order than the most significant bit of the respective mantissa part of the operand in the low order direction, and a guard bit, a round bit and a sticky bit are sequentially added to the lower order than the least significant bit of the respective mantissa part of the operand in the low order direction, and in which a value of 01 is set to the integer part formed by the extended bit and leading bit of the respective mantissa data, a value of 0 is set to the guard bit, round bit and sticky bit of the respective mantissa data, and preshift is applied as necessary such that the non-zero value of the leading bit of either of the mantissa data enters the fraction part of the mantissa data, the value of the least significant bit of the fraction part sequentially goes out to the guard bit and round bit of the mantissa data, and a value of 1 is set to the sticky bit of the mantissa data when there is a bit-discard from the round bit, executing binary addition and subtraction on ($n+6$) bits of the mantissa data thus received, and outputting as the first intermediate result having a data structure of ($n+6$) bits which is the same as in the mantissa data a result obtained by inverting the values of bits other than the sign bit of the result of addition and subtraction when the value of the sign bit of the result of addition and subtraction is 1, and the result of addition and subtraction when the value of the sign bit of the result of addition and subtraction is 0, said rounding adder has the function of outputting as the second intermediate result to said postshift circuit a result obtained by adding 1 to the least significant bit of the fraction part of the first intermediate result from said arithmetic unit when the value of the sign bit of the first intermediate result is 0, the value of the integer part of the first intermediate result is 10 or 11, and the logical sum of the values of the guard bit, round bit and sticky bit of the first intermediate result is 1, or when the value of the sign bit of the first intermediate result is 0, the value of the integer part of the first intermediate result is 10 or 11, the logical sum of the values of the guard bit, round bit and sticky bit of the first intermediate result is 0, and the value of a bit in the higher order than the least significant bit of the fraction part of the first intermediate result by 1 bit is 1, a result obtained by adding 1 to the guard bit of the first intermediate result from said arithmetic unit when the value of the sign bit of the first intermediate result is 0, the value of the integer part of the first intermediate result is 01, and the logical sum of the values of the round bit and sticky bit of the first intermediate result is 1, or when the value of the sign bit of the first intermediate result is 0, the value of the integer part of the first intermediate result is 01, the logical sum of the values of the round bit and sticky bit of the first intermediate result is 0, and the value of the least significant bit of the fraction part of the first intermediate result is 1, a result obtained by adding 1 to the round bit of the first intermediate result from said arithmetic unit when the value of the sign bit of the first intermediate result is 0, the value of the integer part of the first intermediate result is 00, the value of the most significant bit of the fraction part of the first intermediate result is 1, and the value of the sticky bit of the first intermediate result is 1, when the value of the sign bit of the first intermediate result is 0, the value of the integer part of the first intermediate result is 00, the value of the most significant bit of the fraction part of the first intermediate result is 1, the value of the sticky bit of the first intermediate result is 0, and the value of the guard bit of the first intermediate result is 1, or when the value of the sign bit of the first intermediate result is 1, and the first intermediate result from said arithmetic unit in other cases, said shifting part of the postshift-count-encode circuit has the function of outputting as the first postshift data to said postshift circuit data that postshift should be executed by 1 bit in the low order direction when the value of the integer part of the first intermediate result from said arithmetic unit is 10 or 11, data that a quantity of postshift should be 0 when the value of the integer part of the first intermediate result from said arithmetic unit is 01, and data that the number of zero value bits including the leading bit from the leading bit to the first non-zero value bit of the first intermediate result from said arithmetic unit in the low order direction should be a shift quantity in the high order direction when the value of the integer part of the first intermediate result is 00, and said shift correcting part of the postshift-count-encode circuit has a first detecting circuit for outputting a first detecting signal when (n+2) bits from the leading bit to the guard bit of the first intermediate result from said arithmetic unit are non-zero value bits, a second detecting circuit for outputting a second detecting signal when bits other than continuous zero value bits including the extended bit among (n+4) bits from the extended bit to the round bit of the first intermediate result from said arithmetic unit are non-zero value bits, and the function of outputting the second postshift data to said postshift circuit when either of the first and second detecting signals is outputted.

4. A mantissa processing circuit of a floating point arithmetic apparatus for addition and subtraction according to claim 2 or 3, wherein said second detecting circuit provided in said shift correcting part of said postshift-count-encode circuit has a first logic circuit, a second logic circuit and a third logic circuit, in the case where (n+4) bit values b (i) (i=n+3 to 0) are defined such that the value of the extended bit among (n+4) bits from the extended bit to the round bit of the first intermediate result from said arithmetic unit is represented by b (n+3) and the value of the round bit is represented by b (0), said first logic circuit setting an output bit value p (i) to 1 when b (i+1) does not correspond to b (i) (i=n+2 to 0) and to 0 when they correspond to each other, said second logic circuit setting an output bit value q (i) to 1 when b (i+1) is 0 and b (i) is 1 (i=n+2 to 0) and to 0 in other cases, and said third logic circuit outputting the second detecting signal only when the output bit value p (i) of said first logic circuit corresponds to the output bit value q (i) of said second logic circuit for all values of i (i=n+2 to 0).

* * * * *